Oct. 27, 1925.

A. H. PITNEY 1,558,755

PORTABLE POSTAGE METER MACHINE

Filed June 22, 1923        10 Sheets-Sheet 2

A. H. PITNEY

1,558,755

PORTABLE POSTAGE METER MACHINE

Filed June 22, 1923    10 Sheets-Sheet 9

Inventor
Arthur H. Pitney
By Alexander Powell
Attorneys.

Oct. 27, 1925.                                                                 1,558,755
                              A. H. PITNEY
                     PORTABLE POSTAGE METER MACHINE
                   Filed June 22, 1923         10 Sheets-Sheet 10

Patented Oct. 27, 1925.

1,558,755

UNITED STATES PATENT OFFICE.

ARTHUR H. PITNEY, OF STAMFORD, CONNECTICUT, ASSIGNOR, BY MESNE ASSIGNMENTS, TO PITNEY-BOWES POSTAGE METER COMPANY, OF STAMFORD, CONNECTICUT, A CORPORATION OF DELAWARE.

PORTABLE POSTAGE-METER MACHINE.

Application filed June 22, 1923. Serial No. 647,143.

*To all whom it may concern:*

Be it known that I, ARTHUR H. PITNEY, a citizen of the United States, residing at Stamford, in the county of Fairfield and State of Connecticut, have invented certain new and useful Improvements in Portable Postage-Meter Machines; and I hereby declare that the following is a full, clear, and exact description thereof, reference being had to the accompanying drawings, which form part of this specification.

This invention is a novel portable "postage meter" machine adapted to be used by persons, firms, or corporations having a large number of letters to seal and stamp.

The principal object of the present invention is to provide a simple novel portable postage meter machine which will enable the user to buy any desired amount of prepaid postage from the Government and print such postage from time to time on his mail in various quantities and amounts as desired, until the total amount of postage for which he has paid is exhausted, whereupon the machine will become automatically locked so that no further stamps can be printed thereby. In this latter respect the machine resembles the Pitney "postage meter" now in use, see Patent #1,370,668, dated March 8, 1921.

Other minor objects and features of the invention will be hereinafter set forth.

In the novel machine embodying the invention and illustrated in the drawings, the letters are stacked on a suitable letter tray, flap side down, and may be fed by hand past a suitable flap moistener, and a suitable flap sealer; then the letter is caught between the printing die and impression roller and moved therepast, said printing die being rotated by suitable means. The postmark-stamped letter is then delivered onto a suitable table and is ready for mailing.

When the amount of prepaid postage has been exhausted the printing and registering mechanisms become locked so that no more postmark stamps can be printed until the machine or meter is reset. For this purpose the entire printing mechanism and meter may be bodily detached from the sealing mechanism and taken, as a whole, to the post office for resetting, substantially in the manner that the meter of my aforesaid patented machine is re-set. The printing mechanism and meter are then replaced adjacent the sealer and the series of sealing and printing operations can be performed as above described, until the amount of postage paid for is again exhausted.

In the present invention instead of the registering mechanism and part of the printing mechanism being removable; the whole registering and printing apparatus is movable as a unit; and being small and compact can be taken as a unit to and from the post office.

In the complete machine illustrated, I provide means for moistening and sealing the envelopes prior to the printing of the postmark stamps thereon; but it will be obvious that the moistening and sealing devices might be dispensed with in cases where the amount of mail to be handled is so small that the time saved by the use of mechanical moistening and sealing devices is not important.

To enable others to adopt and use the invention I will explain it with reference to the accompanying drawings which illustrate one practical embodiment thereof, and hereafter set forth in the claims the essentials of the invention and the novel features of construction and novel combinations of parts for all of which protection is desired.

Figure 1:
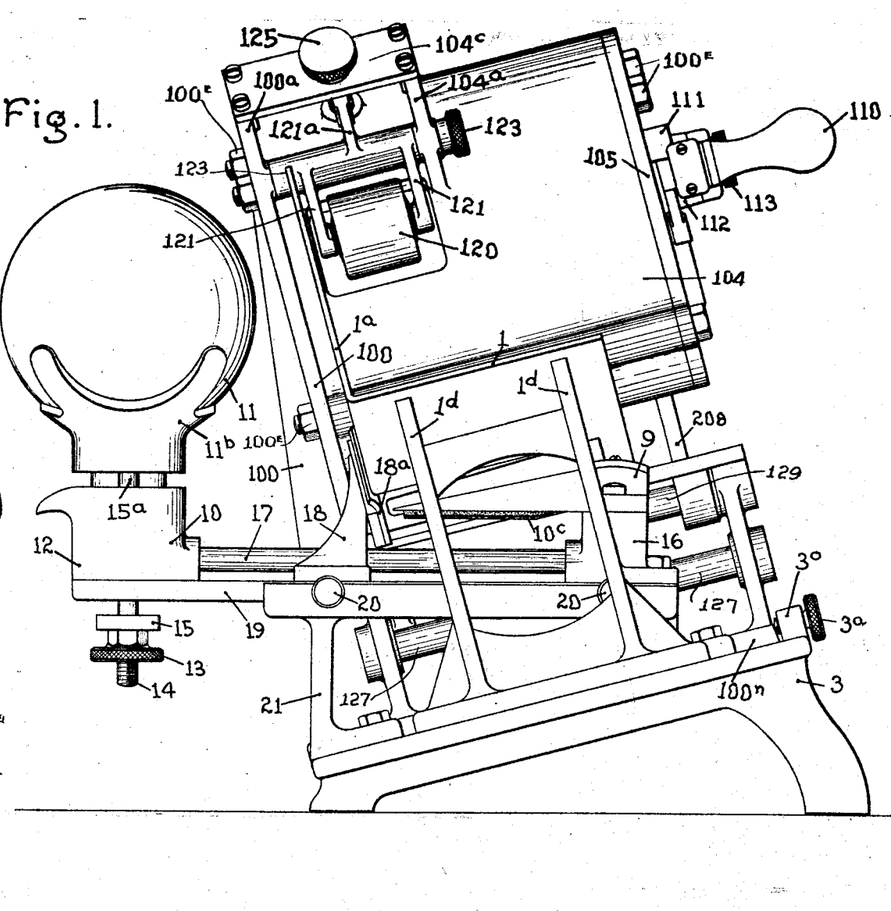
Fig. 1 is a side elevation of my novel machine, assembled.
Figure 2:
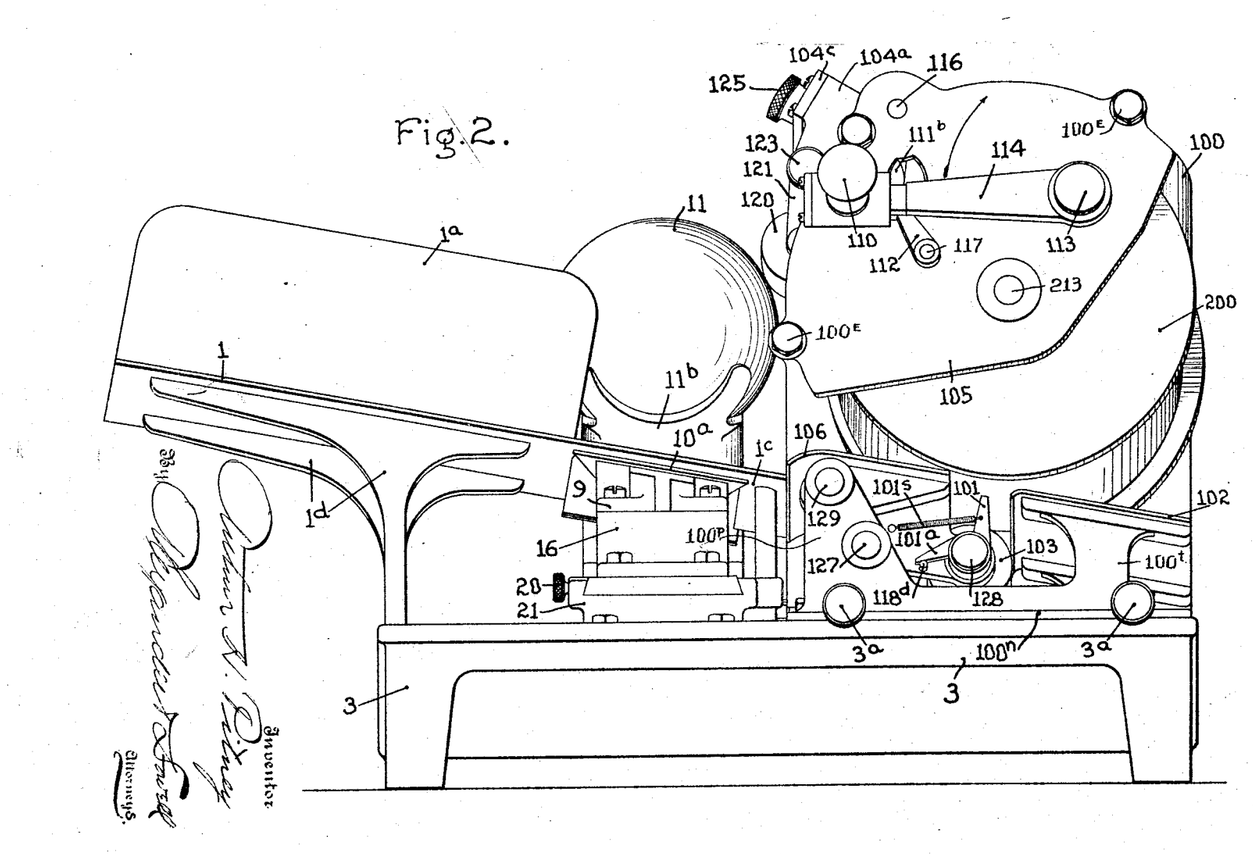
Fig. 2 is a front elevation of said machine assembled.
Figure 3:
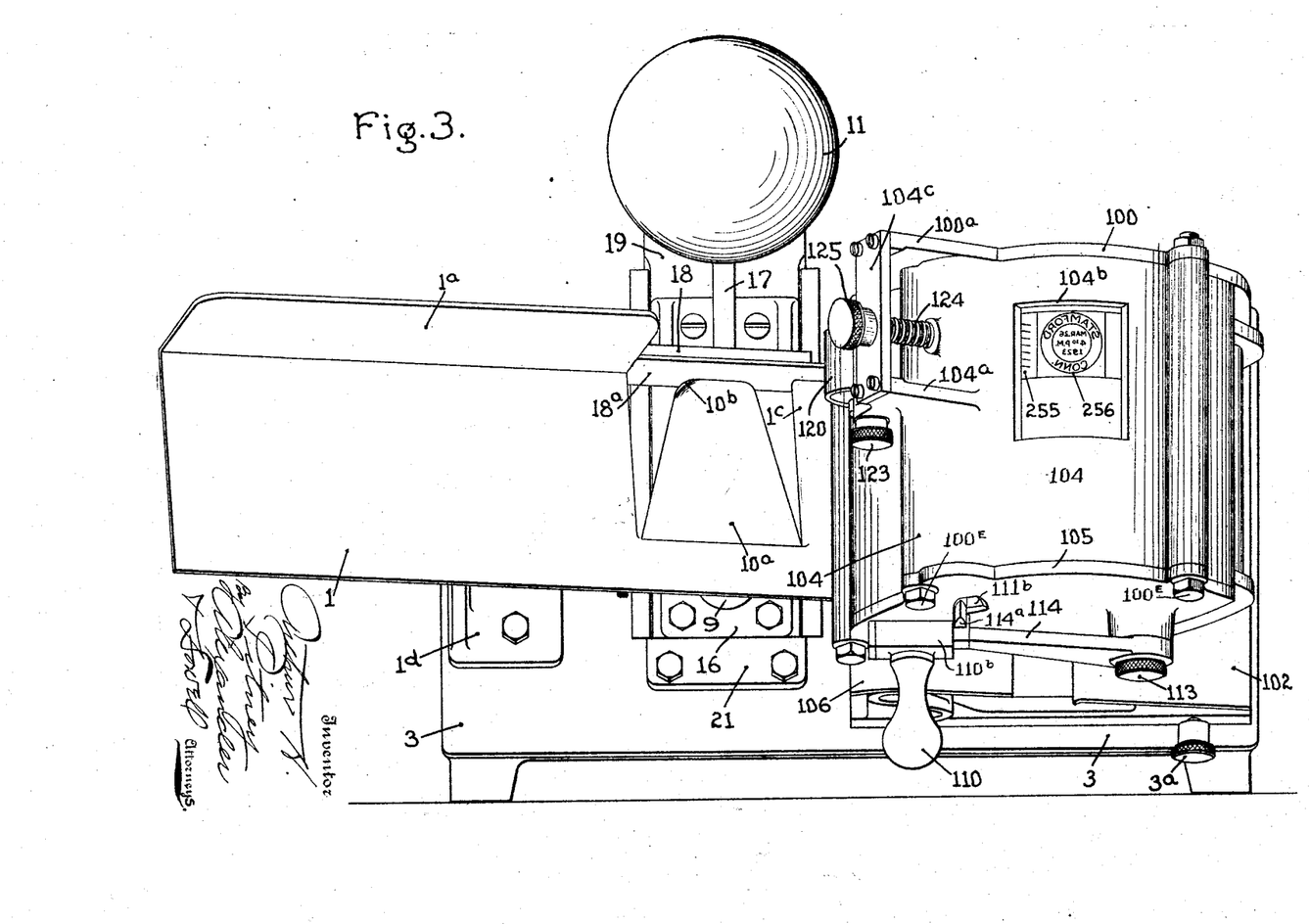
Fig. 3 is a plan view of the machine, assembled.

The complete machine, as shown in Figs. 1–3 of the drawings, includes means for opening and moistening the flap of a letter and sealing same, and means for printing a prepaid postage stamp thereupon, and simultaneously registering the amount of the stamp so printed.

As shown in the drawings, both the envelope moistening and sealing devices are mounted upon a common base 3 which may be of any suitable kind or form, but is preferably such that it can be placed on a table or desk convenient for use.

The letter tray.

As shown, a letter holding tray is supported upon brackets $1^d$ attached to one end of the base 3. The bottom plate 1 of this tray is inclined at an angle to the top of the base, its rear edge being lower than its front edge, and its inner end being lower than its outer end, so that letters placed thereon will have a tendency to slide away from the operator toward the rear end of the machine, and also to slide down the plate 1 toward the printing mechanism, the letters being retained upon the plate 1 by a rear guide plate or flange $1^a$ against which the edges of the envelope rest. The letters are placed flap downward upon the plate 1 with the flap side against the flange $1^a$, and may be moved downward on the plate by hand.

The plate 1 extends above and across a moistener $10^a$ and directs the letters on an even plane to the printer table 106, hereinafter referred to.

The lower inner portion of the table 106 adjacent the moistener $10^a$ is preferably curved downwardly (as in Fig. 2) to receive the flap of the envelope after it has passed under the flap opener and moistener $10^a$ and fold the flap against the back of the envelope, causing it to be sealed.

The flap opener and moistener.

Figures 6, 7:
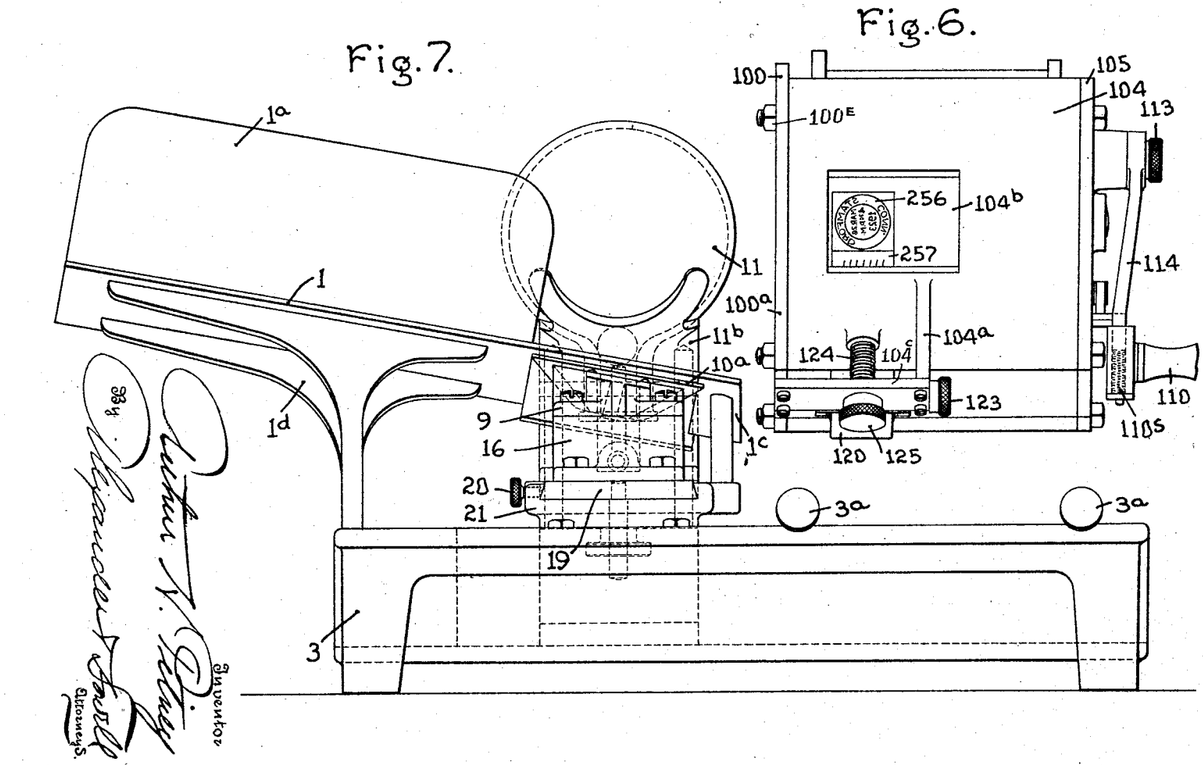
Fig. 6 is a view of said printing and inking members.
Fig. 7 is a front elevation of the envelope tray, moistener and sealer.
Figures 8, 8A:
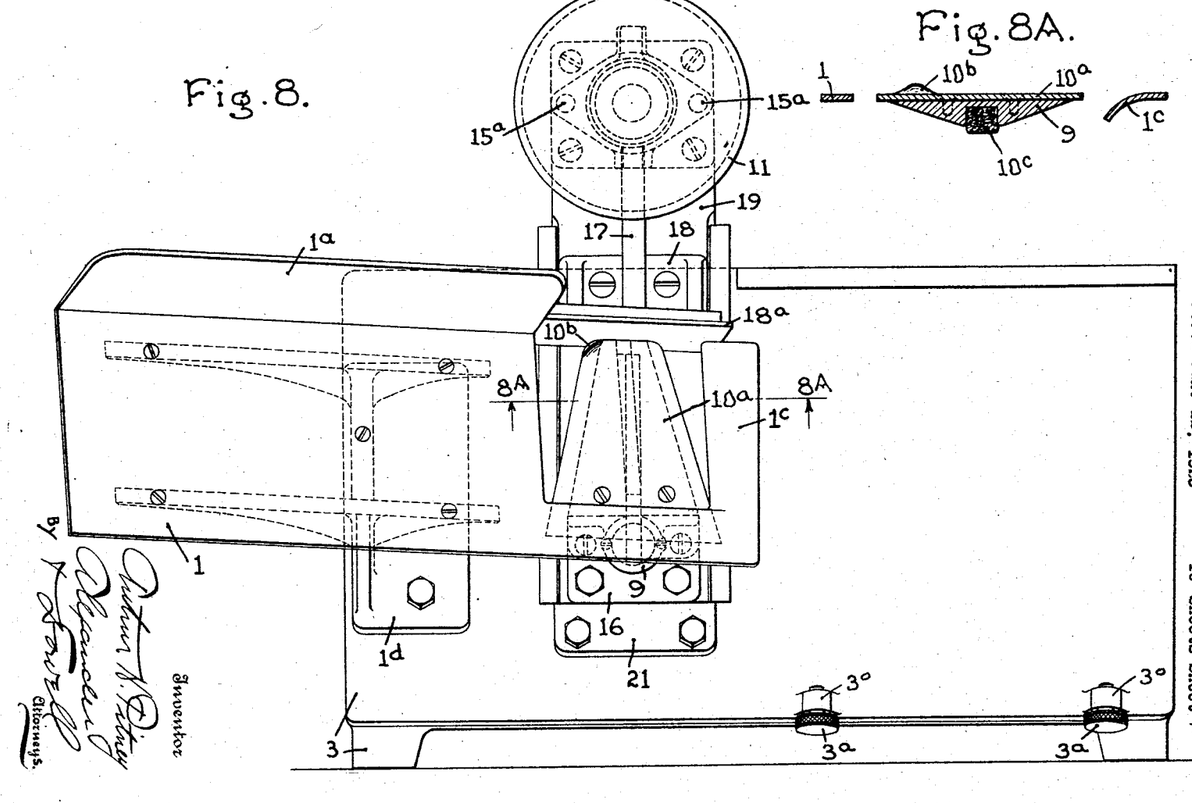
Fig. 8 is a plan view of Fig. 7.
Fig. 8A is a detail section on the line A—A Fig. 8.
Figures 9, 10:
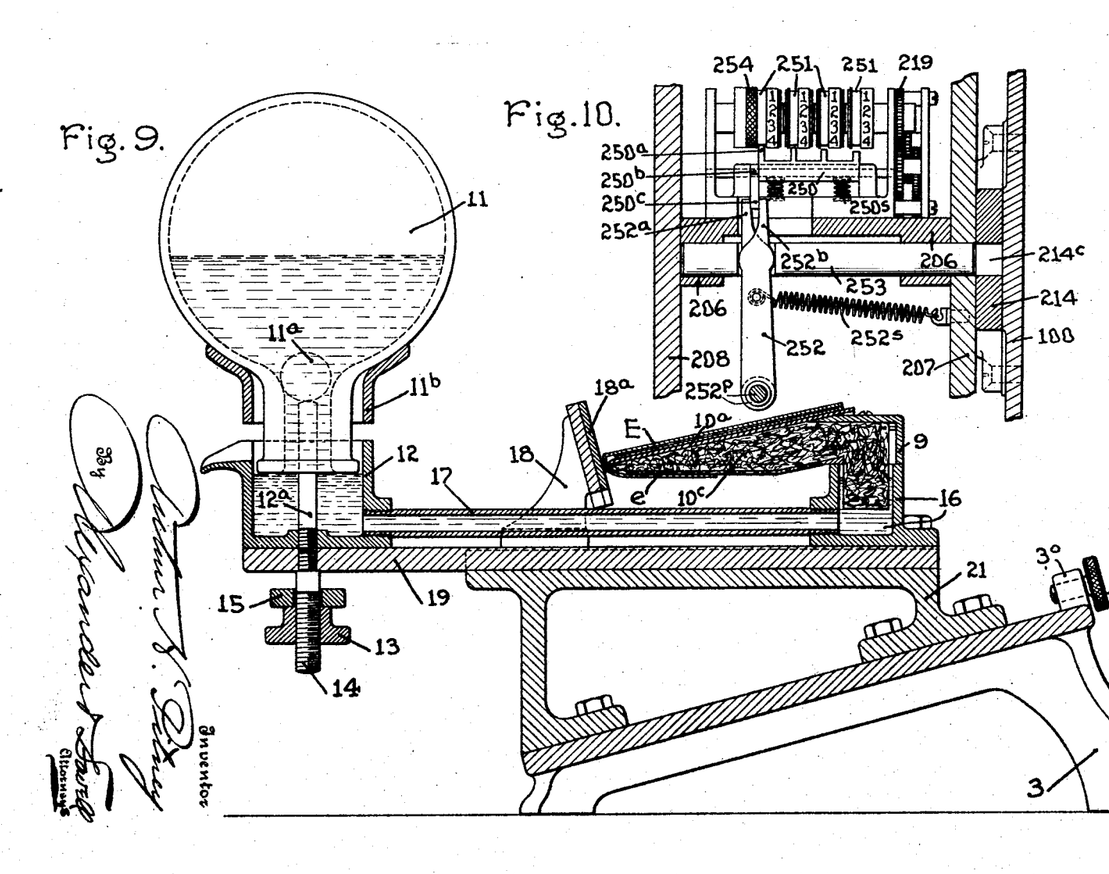
Fig. 9 is a detail section through the envelope moistener.
Fig. 10 is a detail section through the meter showing the counter and locking devices.
Figures 11, 12:
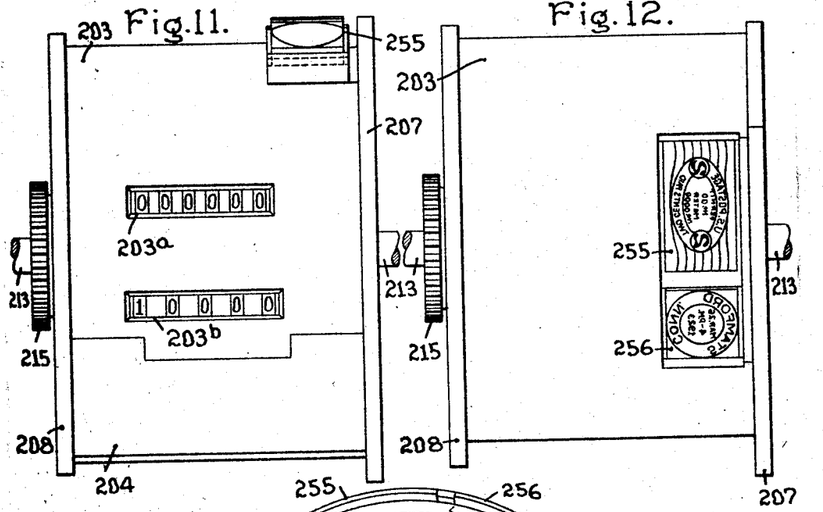
Fig. 11 is a side view of the meter detached.
Fig. 12 is an opposite side view of the meter.
Figure 13:
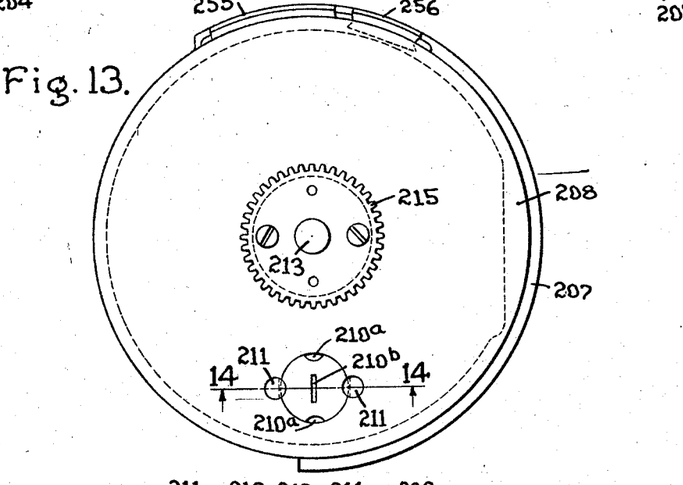
Fig. 13 is an end view of the meter.
Figure 14:
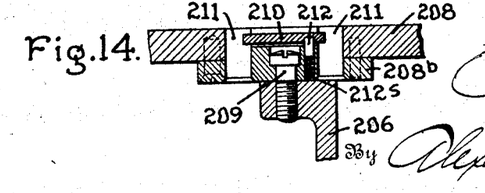
Fig. 14 is a detail sectional view of the meter head seal on the line 14—14, Fig. 13.

As shown in Figs. 7, 8, and 9 the flap opener and moistener comprises a plate $10^a$ suitably supported on a bracket 16 attached to a slide 19 and lying at an angle to the plate 1, the end of the plate $10^a$ adjacent the guide $1^a$ being disposed at a higher elevation than the tray, and the outer end thereof lying below the tray 1.

A felt moistener $10^c$ is held in position underneath the flap opener $10^a$ by means of holder 9 which also supports the flap opener $10^a$; one end of the moistener extends into chamber 16 for the purpose of absorbing water and keeping the sealing edge of the moistener properly wetted. A stand 18 is provided onto which is fastened a fence $18^a$ for the purpose of tracking the envelopes as they pass the moistener.

The inner left hand corner of the plate $10^a$ is upturned, as shown at $10^b$, and its edge will press closely against the under side of an envelope laid flat down on the plate 1, and moved endwise over the plate $10^a$. During such movement part $10^b$ will enter between the flap and back of the envelope and cause the flap to partly open before it reaches the moistener $10^c$.

As shown in Fig. $8^A$, the bracket or holder 9 which holds the felt moistener $10^c$ under and against the flap opener $10^a$ is fastened by suitable screws to the under side of opener $10^a$, and the lower face of said holder 9 tapers upwardly from the moistener $10^c$ to the opener $10^a$ in order that the envelope flap $e$ of the envelope E, after same has been separated from the body of the envelope by the part $10^b$ may be guided past the moistener $10^c$ and from thence may be forced up against the body of the envelope by coming in contact with the rounded edge $1^c$ of the table 1. Envelope E and its flap $e$ are indicated in Fig. 9 of the drawings.

As the envelope slides off the plate $1^a$ onto the plate 106 the moistened flap is pressed upward against the body of the envelope and sealed; and further sealing is effected by the passage of the letter between the printing dies and impression roller, or devices by which the postmark stamp is applied to the sealed envelope as hereinafter explained, and further by the weight of said envelopes in the stacker.

Chamber 16 is supplied with water by means of an inverted bottle 11, containing water, and the trough 12 is kept full of water. A pin $12^a$ is arranged to project into the neck of the bottle 11 (see Fig. 9) and raise ball $11^a$ allowing the water to flow into the trough 12 until it rises to a level with the mouth of the bottle. The level of the water can be raised or lowered by adjusting the bottle holder by means of the knurled adjusting nut 13 which screws upon a stud 14 offering a pressure against cross plate 15. Two rods $15^a$ fastened to plate 15 and bottle holder $11^b$, pass through clearance guide holes in the sides of the trough 12. When the nut 13 is turned the bottle is caused to raise and lower, thereby changing the water level to the desired height. The trough 12, having a constant supply of water feeds the water to chamber 16 through a pipe 17, which connects trough 12 to chamber 16.

The trough 12, stand 18, and chamber 16, are all secured to a base plate 19 which is slidably mounted on a stand 21 on base 3 and detachably secured to the stand by thumb screws 20 (Figs. 1, 2 and 7). If it is desired to print mail matter which does not require sealing, the entire sealer can be removed by loosening thumb screws 20; and an auxiliary table and fence (corresponding to plates 1, 1$^a$, but without being cut away for the admission of the flap opener and moistener, not illustrated) may be slipped into the place formerly occupied by the sealer, thus providing a table for mail to be fed into the printer.

*The postmark stamp printing and registering mechanism.*

In the example shown the postmark stamp printing and registering mechanism is handled as a unit. As shown it is mounted on a suitable frame comprising a base plate 100$^n$, Figs. 1, 4, 5, which is adapted to be fitted between a flange 3$^n$ and lugs 3$^o$ on the base 3; and may be fastened in position by means of thumb bolts 3$^a$.

From the rear side of this plate 100$^n$ rises a standard 100 to the upper side of which is attached one end of a parti-cylindric hood or shell 104 to the outer end of which is attached a front plate 105 (Figs. 1-4 and 5) the front plate and shell being securely fastened to the standard 100 by means of through bolts 100$^e$, as indicated in the drawings.

A spindle 213 is supported at one end in the plate 105, and its other end is supported in an opening in a plate 214 attached to the inside of the plate 100 by screws 214$^s$ (Fig. 15) said shaft 213 having a flange or head 213$^a$ on its inner end which engages a recess 214$^a$ in the plate 214, and is keyed to this plate so that the spindle 213 cannot rotate.

Upon the spindle 213 is rotatably mounted a drum containing ascending and descending registering mechanisms, and carrying the stamp printing dies. I will hereinafter refer to this combination as a whole, by the term "meter drum".

*The meter drum.*

The meter drum may be of any suitable construction, but is preferably made and assembled as hereinafter described.

As shown in Figs. 10-16 the meter drum consists of two circular end plates 207 and 208, and an intermediate cylindrical casing 203. The casing 203 has two glazed sight openings 203$^a$ and 203$^b$, Figs. 10 and 16, through which may be read the figures on the total or ascending counter T and the balance or descending counter B. The casing also has an opening closed by a door 204 (Fig. 16) hinged at 204$^a$, and locked, when closed, by means of a cam 205$^a$ engaging a lug 204$^b$ on the door 204. The locking cam 205$^a$ is made fast to the plug 205$^b$ of a lock 205 which is preferably of the Yale pin tumbler type, and needs no further description here.

Figure 16:
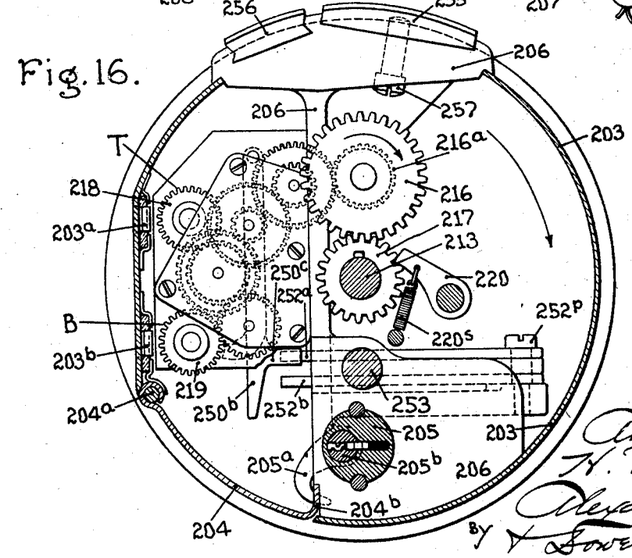
Fig. 16 is a transverse section of the meter showing the register actuating gearing.

In the example shown the indicia die 255, Fig. 16, is fastened to a die holder frame 206 by a screw 257. The postmark die 256 is slidably mounted in said die holder at the outside of the meter drum, and may be removably held in position by any suitable means, and is provided with changeable date and hour slugs as usual. At each rotation of the meter drum these dies 255 and 256 cooperate with an impression roller 103 hereinafter referred to to imprint an envelope if in proper position.

To the meter drum plate 208 is secured a gear 215 concentric with shaft 213 (Figs. 5, 11-13), and this gear meshes with a gear 115 attached to the inner end of a stub shaft 114$^s$ journaled in the plate 105; and to the outer end of this shaft is attached a handle 114 by which the shaft 114$^s$ and gear 115 can be manually turned. For each rotation of the shaft 114$^s$ the meter drum 200 is caused to make one complete revolution; when the parts are in proper working condition a postmark stamp will be printed at each rotation of the drum.

Means are provided, as hereinafter explained, whereby the handle 114 will be unlocked when a letter is properly presented for printing, and whereby it will be locked after it has made a complete operation, and until it is again released.

Within the meter drum are mounted an ascending counter or total register, indicated at T, and a balance counter or descending register indicated at B. These registers may be of any suitable type, but are preferably of the type described in my application case #6754, filed July 12, 1922, Serial No. 574,427, and case #6794, filed December 12, 1922, Serial No. 606,427.

Suitable gearing is provided (as indicated in Fig. 16) whereby for each rotation of the meter drum the units wheels of these registers are respectively operated in accordance with the denomination of the postmark stamp printed, each unit wheel being moved one point for a 1¢ stamp; or two points for a 2¢ stamp, etc.

In the example shown, mechanism is provided whereby for each rotation of the meter drum motion is imparted to the units wheels gears 219 and 218 of the respective registers (Fig. 16), the ratio being 10 revolutions of the meter drum to one revolution of the register unit wheel gears; each of said gears being directly connected to the related units wheel of their respective registers. The total sum of the impressions made is recorded in ascending progression on the total counter or ascending register T, and in descending progression on the balance counter or descending register B.

Figure 15:
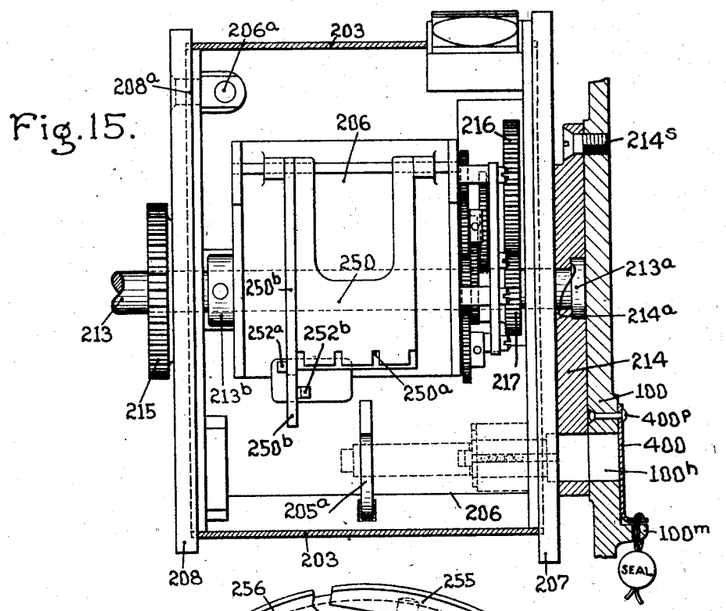
Fig. 15 is a detail section through the meter showing part of the register or locking devices.

As indicated in Figs. 15 and 16, each gear 218, 219 is driven by a suitable train of gearing from a gear 216ª attached to a gear 216, suitably supported on a framing 206 within the meter drum, and this gear 216 meshes with a pinion 217 keyed on the spindle 213 within the meter drum. Consequently when the meter drum is rotated the gear 216 takes up planetary motion around the gear 217 in the direction of rotation of the drum, and the gearing is so proportioned that for each rotation of the drum the units wheels of the registers will be actuated as above described.

The meter drum is limited to rotation in one direction by a pawl 220, Fig. 16, held in engagement with the fixed gear 217 by a spring 220ˢ. Said pawl, prevents the meter drum 200 from being turned backward and thereby improperly altering the record of impressions made.

In Fig. 10 I have indicated the descending counter which is similar to that shown in my aforesaid applications, and comprises a series of numeral wheels 251, each of which is provided with a slot adapted to be engaged by a tooth 250ª on a locking plate 250, substantially such as described in my aforesaid applications, and which plate is normally pressed toward the wheel by springs 250ˢ. The units wheel of this series is fixed to the shaft or gear 219 so as to be rotated thereby; and the units wheel "carries over" to the tens wheel; the tens "carries over" to the hundreds; and so on, as described in the aforesaid applications.

A handle 250ᵇ (Figs. 10, 15, and 16) is fastened to one side of the locking comb 250, and has a lug 250ᶜ projecting oppositely to the teeth 250ª. Said lug normally projects into the path of a lug 252ª on a lever 252 (when the meter is charged or in operative position), which lever is pivoted at 252ᵖ (Fig. 10) on a suitable support within the meter drum and normally holds the lever 252 in the position indicated in Fig. 10. This lever 252 engages a notch in a slidable locking bolt 253, which is mounted in the meter drum and is adapted to be projected by a spring 252ˢ through an opening in head 207 into engagement with a socket 214ᶜ in plate 214 (see Fig. 10) and when so engaged it will prevent rotation of the meter drum. The bolt 253 is shown retracted in Fig. 10, being normally held in such position by the engagement of the lug 252ª with the finger 250ᶜ. But when all the register-ing wheels 251 in the descending meter B reach "zero" so that all the fingers 250ª in the locking plate 250 can enter the corresponding notches in such registering wheels (as described in my aforesaid applications) the springs 250ˢ swing the plate 250 toward the registering wheels and thus withdraws the finger 250ᶜ out of the path of the lug 252ª, whereupon the spring 252ˢ swings lever 252 and causes it to project bolt 253 into engagement with socket 214ᶜ, thereby locking the meter drum to the main frame 100 and preventing further rotation of the meter drum until the bolt is retracted.

When bolt 253 is engaged with socket 214ᶜ the machine is inoperative and must be taken to the post office to be re-set. When taken to the post office the proper official unlocks the door 204 which he opens with a key retained by the Post Office Department. After opening the meter drum door 204 the official re-sets the mechanism as follows: He pushes lock bar handle 252ᵇ to the left thereby disengaging bolt 253 from socket 214ᶜ. Then while so holding the bolt disengaged he pulls down the locking comb lever 250ᵇ to release the numeral wheels of the descending counter; he then releases the handle 252ᵇ and turns the knurled sleeve 254 downward, thereby covering the notch in the counter wheel 251 so as to prevent the locking comb teeth 250ª from re-engaging the slots in wheels 251 (as described in my said applications) therefore causing lug 250ᶜ to obstruct the path of lever 252 and in turn holding lock bar 253 out of engagement with hole 214ᶜ and leaving the meter free to operate.

When the register B is locked, as above described, the register T will also be locked, because the whole train of gearing is locked, and further rotation of the meter drum is prevented, and when register B is re-set ready for further operations, register T will also be ready for further operations.

In the particular construction of the meter drum shown the metal cylinder 203 is held securely to the die holder and frame 206 by means of grooves cut in the side plates 207 and 208. Plate 207 is secured to the frame 206 by two dowel pins and screwed from the inside of the meter drum. Fastening this plate 208 is the last of the assembly operations. When plate 208 is to be fastened it is placed over the cylinder 203 so that the hole in lug 208ª is in alignment with a pin 206ª doweled into the frame 206 (Figs. 10, 13–16). The plate is then turned until lug 208ª engages the pin 206ª, at which time the hole in lock plate 208ᵇ, Fig. 13, also becomes aligned with a screw hole in frame 206. The screw 209 is then fastened. A seal plate 210 having two semi-circular notches 210ª (Fig. 13) cut on its periphery to clear the pins 211 is placed in position and turned by means of a screw driver entered into a slot 210ᵇ in the face of the plate. When the plate is turned its edges engage the slots cut in pins 211. When the semi-circular notches in plate 210 are at right angles to pins 211 a small plug 212 is pushed into a blind hole drilled in the bottom side of plate 210 (Figs. 11–13) by a spring 212ˢ, and prevents the plate 210 from being turned in either direction, thereby sealing the screw 209 and completely housing the meter mechanism and rendering it inaccessible to unauthorized persons.

Any suitable means may be provided for normally holding the meter drum against rotation until a letter is advanced to the printing point. For this purpose, and as shown in the drawings, a handle 110 (Figs. 4, 6) is slidably mounted on the crank 114, and is normally pressed outward by a spring 110ˢ. A forward stop 111 and a back stop 111ᵃ are attached to a shaft 116 journaled in the upright 100 and plate 105 above the meter drum. The forward stop 111 has a lug 111ᵇ which projects through an opening in the plate 105 (see Fig. 5) into the path of a lug 114ᵃ on the crank 114. A spring 111ˢ connected to shaft 116 normally tends to turn the shaft and hold the stop lug 111ᵇ in position to engage with the lug 114ᵃ, and the stop 111ᵃ in position to engage with a notch 208ᶻ in the periphery of the meter drum head 208. When stop 111 is engaged with the lug 114ᵃ, clockwise movement of the crank 114 is prevented by said stop (Fig. 5), and anti-clockwise rotation of the meter drum is prevented by the stop 111ᵃ engaging notch 208ᶻ. When lug 114ᵃ is engaged with stop 111 backward rotation of the crank is prevented by a catch 112 (Fig. 5) pivoted on a stud 117 on plate 105, one arm 112ᵃ of which is attached to catch 112 and urged by a spring 112ˢ to hold the catch 112 yieldingly in engagement with the lug 114ᵃ opposite the stop 111ᵇ.

Figure 5:
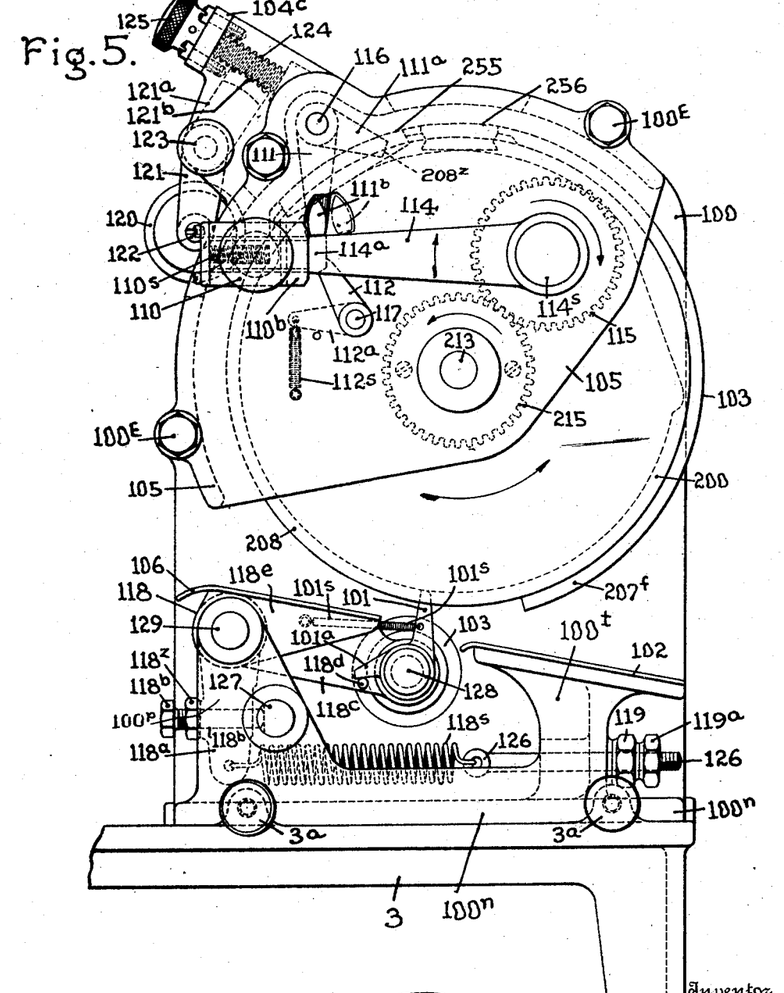
Fig. 5 is a front elevation of the printing and inking mechanism.

The parts being in condition for operation, when it is desired to rotate the meter drum the operator grasps handle 110 and moves it inward until the inner end of slide 110ᵇ (to which the handle is attached) engages lug 111ᵇ and pushes lug 111ᵇ inward, to the position indicated in dotted lines in Fig. 5, in which position lug 114ᵃ can move past the stop lug 111ᵇ, thus allowing the crank to be turned clockwise in the direction of the arrows thereon, shown in Fig. 5. This shifting of the stop 111ᵇ simultaneously disengages stop 111ᵃ from the notch 208ᶻ in meter drum plate 208, and the meter drum can then be turned one complete revolution by turning the crank 114 one complete revolution. As soon as the stop 114ᵃ has passed stop lug 111ᵇ the latter moves back into position to again engage stop 114ᵃ and arrest the crank 114 when it has made a complete revolution; at which time the meter drum will also have made a complete revolution.

The stops permit only one revolution of the crank and meter drum to be made each time the handle 10 is moved inward to disengage stop 111ᵇ from the stop 114ᵃ, and provided the meter is not locked by the engagement of bolt 253 with the socket 214ᶜ, as hereinbefore described.

On the completion of one revolution of the drum lug 114ᵃ comes into contact with the stop 111ᵇ, and back stop 111ᵃ engages notch 208ᶻ and prevents the drum being reversed; and also relieves any strain on pawl 220 and gear 217 (Fig. 16) which might otherwise be caused by attempting to reverse the drum. Also the catch 112 simultaneously engages lug 114ᵃ and will prevent reverse movement of the lever 114.

*The impression devices.*

An impression roller 103 (Figs. 2, 4, 5) is provided to cooperate with the dies 255 and 256 in printing postmark stamps upon the letters, and it also assists in sealing the envelopes and in discharging the letters onto the rear table 102.

Figure 4:
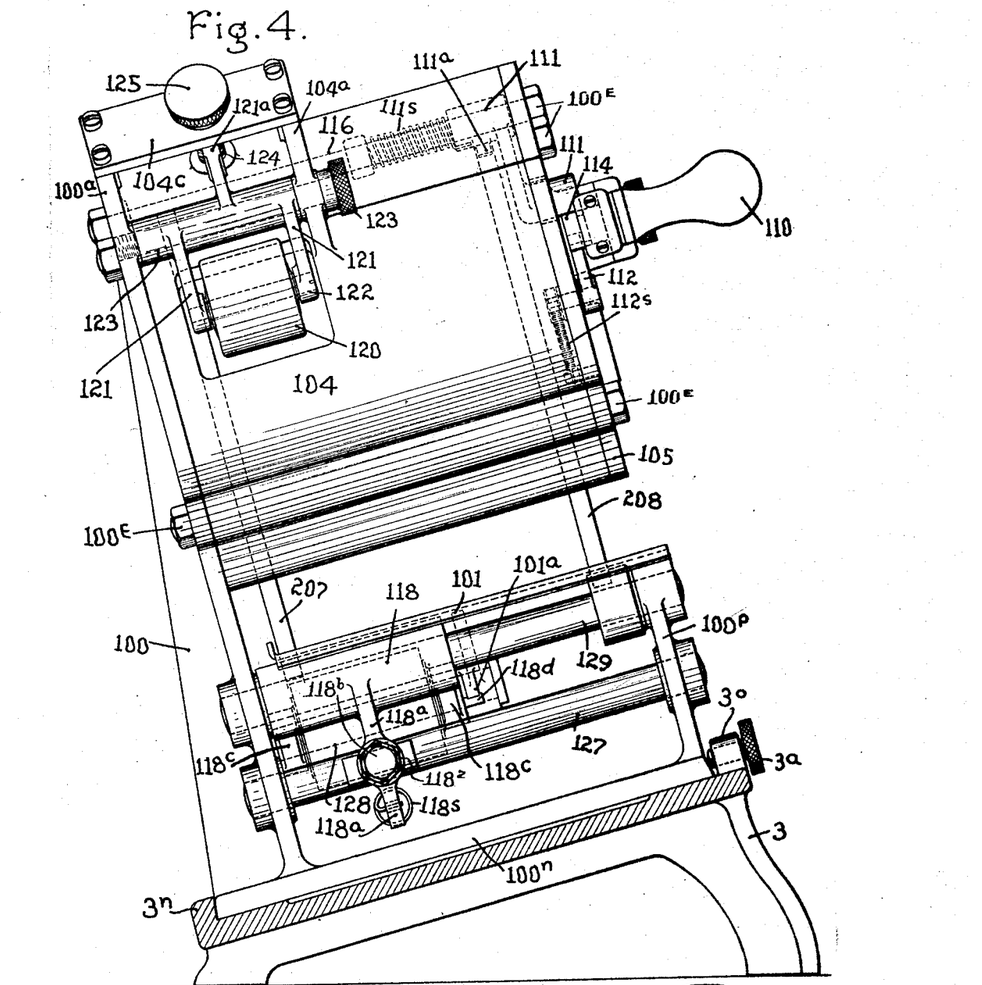
Fig. 4 is a side elevation of the printing and inking mechanism.

The impression roller 103 is preferably rotatably mounted upon a shaft 128 which is supported in arms 118ᶜ of a casting 118 which is pivoted on a shaft 129 journaled at one end in upright 100 and at the other end in a standard 100ᵖ below the plate 105 (Figs. 4 and 5). The bracket 118 also has a depending arm 118ᵃ to which is connected one end of a spring 118ˢ, the other end of which is connected to a bolt 126 passing through the base of a bracket 100ᵗ supporting plate 102 on the base 100ⁿ. Bolt 126 is provided with adjusting and jam nuts 119 and 119ᵃ by which the tension of spring 118ˢ can be regulated. The position of the impression roller 103 relative to the periphery of the meter drum and printing surfaces of the dies 255, 256, is regulable by a bolt 118ᵇ tapped through the arm 118ᵃ and engaging a stop rod 127 fixed to the plates 100 and 100ᵖ of the frame (Fig. 4) said bolt being provided with a jam nut 118ᶻ. By this means the impression roller 103 may be held in operative position with any desired pressure. The table or plate 106 is attached to arms 118ᶜ of the bracket 118, and directs the envelopes to the impression roller; and is thus kept in fixed relation to the impression roller, while adjustable therewith. Pivoted on the rod 128 is a member having an upstanding trip stop finger 101 which projects into the path of the letter, and above the periphery of the impression roller 103 (Figs. 2, 4, 5). This stop finger is normally held in the position shown in Fig. 5 by a spring 101ˢ and its movement is limited by a lug 101ᵃ engaging a pin 118ᵈ on the adjacent arm 118ᶜ of bracket 118. This stop finger is normally held in the position shown in Fig. 5, and will arrest a letter directed between the meter drum and impression roller until the die 255 is in position to engage the letter and carry it on past the impression roller and discharge it onto the table 102.

The meter drum is provided with a segmental peripheral flange 207$^f$ adapted to engage the periphery of roller 103 and cause same to turn, said flange 207$^f$ being conveniently formed on the head 207 and beginning at a point in advance of the die 255 (see Fig. 5) and extending a sufficient distance around the periphery of the drum to insure that it will cause the impression roller 103 to begin to rotate just before the die 255 comes into contact therewith, and continue to rotate a sufficient time after both dies have printed, to insure that the letter will be carried on past the roll 103 and discharged onto the table 102.

Inking devices.

Ink may be supplied to the dies 255, 256 by any suitable means. As shown, a felt roller 120 is rotatably mounted on a headless stud 122 supported on arms 121 on a casting pivoted on a bolt 123 (Figs. 1, 5) mounted in a stud 104$^a$ on the shell 104 and in a corresponding extension 100$^a$ of the frame 100. Casting 121 has a rearwardly extending arm 121$^a$ having a segment 121$^b$ on its end engaging a worm 124, which has bearings in the shell 104 and in a plate 104$^c$ attached to the parts 104$^a$, 100$^a$. The worm 124 can be turned by a knurled knob 125, so as to turn the segment and rock casting 121 and adjust the inking roller 120 inwardly or outwardly so as to properly contact with and supply ink to the surfaces of the printing dies 255, 256, as they move therepast; this adjustment also compensates for any wear on the inking roll.

The bolt 123 can be unscrewed to permit the frame 121 carrying roller 120 to be detached when it is desired to re-ink or change the roll 120. Roll 120 is preferably a felt roll saturated with ink; and will supply ink to the dies 255, 256, at each rotation of the meter drum.

Operation.

The envelopes are stacked on the tray 1 (Figs. 1, 2, 3) with the flaps underneath and adjacent the fence 1$^a$. They may be fed by hand successively from the top of the pile to the flap opener and moistener 10. As the envelope is moved toward the printer the flap is opened by the plate 10$^a$ as described and is wetted by the moistener 10$^c$; and then as the letter moves past the sealer 1$^c$ the flap is sealed to the back of the envelope; then the letter is moved on until it strikes the trip stop 101, by which its leading end is arrested. The handle 110 is then moved inward to disengage forward stop 111$^b$ as described, and then the handle is turned in the direction of the arrow, Fig. 2, and by means of spur gear connection causes the meter drum to rotate in the opposite direction (counter clock-wise).

As the handle is turned the trip stop 101 is cleared from the path of the letter by engagement with the forward end of flange 207$^f$, which engages the trip stop 101 and moves it out of the path of the envelope just as or before the printing die 255 engages the envelope. Then the envelope is carried on between the die 255 and impression roller 103 by means of frictional contact between the opposed rotating members, and the dies 255, 256, make their impressions on the letter, and the letter is moved and delivered onto the table 102. Upon completing one revolution of the drum handle 110 is arrested by the forward stop 111$^b$ engaging crank 114, and the reverse stop 112 engages the opposite side of the crank and prevents the handle from being rotated in the wrong direction. Each revolution of the meter drum is recorded by means of the register hereinbefore described in detail.

When the amount of prepaid postage is exhausted the meter drum is locked by the movement of the locking plate 250, as hereinbefore described, and allows the bolt 253 to engage socket 214$^c$, thereby locking the meter drum against rotation until the register is re-set, as hereinbefore explained.

The entire printing unit is then removed from the base 3, and the handle and crank are removed by unscrewing the knurled nut 113. Then the printing unit is placed in a suitable case and can be readily taken to the post office to be charged. The postmaster breaks the seal and opens the shutter which is provided to cover the hole, giving access to the meter locking devices. He then unlocks the meter drum door, and charges the meter for the amount paid by the purchaser, as hereinbefore explained. Then he locks the door and seals the key hole shutter. The printing unit then is ready for use. When the amount of postage paid for shown on the descending counter is again exhausted the meter drum is again automatically locked and the machine rendered inoperative.

The means for closing and sealing the keyhole of the meter door lock is illustrated in Fig. 15 of the drawings. A hole 100$^h$ is bored though the main frame 100 and plate 214, in such position as to register with the keyhole of the lock 205 when the drum is in its normal position of rest, either between printing operations, or when it is locked to the frame plate 214 at the discharging of the counter. A plate 400, pivoted to the frame 100 by a rivet 400ᵖ can be made to close, or to swing clear of the hole 100ʰ and by this means close or give access to the keyhole of the lock 205. After charging the meter, locking the door, and withdrawing the key, plate 400 is swung over the hole 100ʰ, and the plate is sealed into closed position by passing the seal wire through holes in the upturned end of plate 400, and through a lug 100ᵐ in the frame 100. The keyhole can not be reached except through hole 100ʰ, since the drum can not be withdrawn from contact with the plate 214 except by destroying plate 210, covering screw 209 (Fig. 14) and dis-assembling the whole unit. By sealing the key hole in this manner, the necessity of having to revolve the seal with the drum is dispensed with.

What I claim is:

1. In a machine of the character specified, a frame, a meter drum rotatably mounted upon said frame, a printing surface on said drum adapted to print stamps, a register in the drum, and gearing whereby the register is actuated at each rotation of the drum in accordance with the denomination of the stamp printed.

2. In combination with mechanism as set forth in claim 1, means for locking the register when it has made a pre-determined number of operations.

3. In combination with mechanism as set forth in claim 1, a second register whereby the total of the operations of the first register is registered.

4. In combination with mechanism as set forth in claim 1, means for locking the register when it has made a pre-determined number of operations; and means whereby when the register is locked further rotation of the meter drum is prevented until the register is re-set.

5. In combination with mechanism as set forth in claim 1, means for locking the register when it has made a pre-determined number of operations; a second register whereby the total of the operations of the first register is registered; and means for operating the second register in accordance with the operation of the first register.

6. In combination with mechanism as set forth in claim 1, means for locking the register when it has made a pre-determined number of operations; means whereby when the register is locked further rotation of the meter drum is prevented until the register is re-set; a second register whereby the total of the operations of the first register is registered; and means for operating the second register in accordance with the operation of the first register.

7. In combination with mechanism as set forth in claim 1, a stop for arresting the letter in position for printing until the printing surface is ready to print thereupon, means for removing the stop before the beginning of the printing operation.

8. In combination with mechanism as set forth in claim 1, a yieldable impression member mounted on the frame adjacent the meter drum and adapted to cooperate with the printing devices on the drum, substantially as described.

9. In combination with mechanism as set forth in claim 1, a yieldable impression member mounted on the frame adjacent the meter drum and adapted to cooperate with the printing devices on the drum; a stop for arresting the letter in position for printing until the printing surface is ready to print thereupon, and means for removing the stop to permit the printing operation.

10. In a machine of the character specified, a frame, a meter drum rotatably mounted in said frame, a stamp printing surface at the periphery of the drum adapted to coact with a related impression member on the frame to print stamps on letters passed therebetween, a register in the drum, and gearing whereby the units member of the register is actuated at each rotation of the drum, in accordance with the denomination of the stamp printed.

11. In combination with mechanism as set forth in claim 10, means for locking the register when it has made a pre-determined number of operations.

12. In combination with mechanism as set forth in claim 10, a second register whereby the total of the operations of the first register is registered, and means for operating the second register, in accordance with the operation of the first register.

13. In combination with mechanism as set forth in claim 10, means for locking the register when it has made a pre-determined number of operations, and means whereby when the register is locked further rotation of the meter drum is prevented until the register is re-set.

14. In combination with mechanism as set forth in claim 10, means for locking the register when it has made a pre-determined number of operations, a second register whereby the total of the operations of the first register is registered; and means for operating the second register in accordance with the operations of the first register.

15. In combination with mechanism as set forth in claim 10, means for locking the register when it has made a pre-determined number of operations, and means whereby when the register is locked further rotation of the meter drum is prevented until the register is re-set, a second register whereby the total of the operations of the first register is registered; and means for operating the second register in accordance with the operation of the first register.

16. In combination with mechanism as set forth in claim 10, a stop for arresting the letter in position for printing until the printing surface is ready to print thereupon, and means for removing the stop to permit the printing operation.

17. In mechanism as set forth in claim 10, the impression member being yieldably mounted on the frame adjacent the meter drum, and means for adjusting the impression member.

18. In a machine of the character specified, a frame having a hood, a meter drum rotatably mounted on said frame within said hood, a postmark printing surface adjacent the periphery of said drum adapted to coact with a related impression member on the frame to print postmark stamps on letters passed therebetween, means for rotating the drum, a register in the drum, gearing in the drum whereby the units member of the register is actuated once for each rotation of the drum and in accordance with the denomination of the stamp printed; and an impression member on the frame adjacent the drum.

19. In combination with mechanism as set forth in claim 18, a second register whereby the total of the operations of the first register is registered, and means for operating the second register in accordance with the operation of the first register.

20. In combination with mechanism as set forth in claim 18, means for locking the register when it has made a pre-determined number of operations.

21. In combination with mechanism as set forth in claim 18, means for locking the register when it has made a pre-determined number of operations, and means whereby when the register is locked further rotation of the meter drum is prevented until the register is re-set.

22. In combination with mechanism as set forth in claim 18, means for locking the register when it has made a pre-determined number of operations, a second register whereby the total of the operations of the first register is registered; and means for operating the second register in accordance with the operation of the first register.

23. In combination with mechanism as set forth in claim 18, means for locking the register when it has made a pre-determined number of operations; means whereby when the register is locked further rotation of the meter is prevented until the register is re-set; a second register whereby the total of the operations of the first register is registered; and means for operating the second register in accordance with the operation of the first register.

24. In combination with mechanism as set forth in claim 18, a stop for arresting the letter in position for printing until the printing surface is ready to print thereupon, and means for removing the stop before the beginning of the printing operation.

25. In combination with mechanism as set forth in claim 18, the impression member being yieldably mounted on the frame adjacent the meter drum and adapted to cooperate with the printing surfaces on the drum, substantially as described.

26. In combination with mechanism as set forth in claim 18, the impression member being yieldably mounted on the frame adjacent the meter drum and adapted to cooperate with the printing surface on the drum, a stop for arresting the letter in position for printing until the printing surface is ready to print thereupon; and means for removing the stop to permit the printing operation.

27. In combination with mechanism as set forth in claim 1, an inking roller adjustably mounted on a stationary support adjacent the periphery of the drum, and adapted to ink the printing surfaces as the drum is rotated.

28. In combination with mechanism as set forth in claim 10, an inking roller adjustably mounted on a stationary support adjacent the periphery of the drum, and adapted to ink the printing surfaces of the dies as the drum is rotated.

29. In combination with mechanism as set forth in claim 18, an inking roller adjustably mounted on a stationary support adjacent the periphery of the drum, and adapted to ink the printing surfaces of the dies as the drum is rotated.

30. In combination with mechanism as set forth in claim 1, a yieldable impression member mounted on the frame adjacent the meter drum and adapted to cooperate with the printing devices on the drum, and a flange on the drum adapted to engage the impression roller and cooperate therewith in forwarding the letters.

31. In combination with mechanism as set forth in claim 10, a yieldable impression member mounted on the frame adjacent the meter drum and adapted to cooperate with the printing devices on the drum, and a flange on the drum adapted to engage the impression roller and cooperate therewith in forwarding the letters.

32. In combination with mechanism as set forth in claim 18, the impression roller being yieldably mounted on the frame adjacent the meter drum and adapted to cooperate with the printing devices on the drum, and a flange on the drum adapted to engage the impression roller and cooperate therewith in forwarding the letters.

33. In combination with mechanism as set forth in claim 1, a stop for arresting the letter in position for printing, and a flange on the drum adapted to disengage the stop just before the printing member engages the letter.

34. In combination with mechanism as set forth in claim 10, a stop for arresting the letter in position for printing, and a flange on the drum adapted to disengage the stop just before the printing member engages the letter.

35. In combination with mechanism as set forth in claim 18, a stop for arresting the letter in position for printing, and a flange on the drum adapted to disengage the stop just before the printing member engages the letter.

36. In combination with mechanism as set forth in claim 1, a yieldable impression member mounted on the frame adjacent the meter drum and adapted to cooperate with the printing devices on the drum, a stop for arresting the letter in position for printing, and a flange on the meter drum adapted to disengage the stop just before the printing surface engages the letter, said flange cooperating with the impression roller to forward the letter after the printing is effected.

37. In combination with mechanism as set forth in claim 10, a yieldable impression member mounted on the frame adjacent the meter drum, and adapted to cooperate with the printing devices on the drum, a stop for arresting the letter in position for printing, and a flange on the meter drum adapted to disengage the stop just before the printing surface engages the letter, said flange cooperating with the impression roller to forward the letter after the printing is effected.

38. In combination with mechanism as set forth in claim 1, a movable plate for locking the register when it has reached zero, a spring actuated lever operated by said plate, and a bolt controlled by said lever adapted to be projected by said lever into engagement with the frame to prevent further rotation of the meter drum when the register is locked.

39. In combination with mechanism as set forth in claim 10, a movable plate for locking the register when it has reached zero, a spring actuated lever controlled by said plate and a bolt operated by said lever adapted to be projected by said lever into engagement with the frame to prevent further rotation of the meter drum when the register is locked.

40. In combination with mechanism as set forth in claim 18, a movable plate for locking the register when it has reached zero, a spring actuated lever controlled by said plate, and a bolt operated by said lever adapted to be projected by said lever into engagement with the frame to prevent further rotation of the meter when the register is locked.

41. In combination with mechanism as set forth in claim 1, a movable plate for locking the register when it has reached zero, a spring actuated lever controlled by said plate; a bolt operated by said lever adapted to be projected by said lever into engagement with the frame to prevent further rotation of the meter drum when the register is locked, a door in the meter drum for permitting access to the parts to re-set the meter; and means in the drum for locking said door in closed position.

42. In combination with mechanism as set forth in claim 10, a movable plate for locking the register when it has reached zero, a spring actuated lever controlled by said plate, a bolt operated by said lever adapted to be projected by said lever into engagement with the frame to prevent further rotation of the meter drum when the register is locked, a door in the meter drum for permitting access to the parts to re-set the meter, and means in the drum for locking said door in closed position.

43. In combination with mechanism as set forth in claim 18, a movable plate for locking the register when it has reached zero, a spring actuated lever controlled by said plate; a bolt operated by said lever adapted to be projected by said lever into engagement with the frame to prevent further rotation of the meter drum when the register is locked, a door in the meter drum for permitting access to the parts to re-set the meter, and means in the drum for locking said door in closed position.

In testimony that I claim the foregoing as my own, I affix my signature.

ARTHUR H. PITNEY.